US009060016B2

(12) United States Patent
Han

(10) Patent No.: US 9,060,016 B2
(45) Date of Patent: Jun. 16, 2015

(54) APPARATUS AND METHOD FOR BLOCKING ZOMBIE BEHAVIOR PROCESS

(75) Inventor: Seung Chul Han, Seoul (KR)

(73) Assignee: NPCORE INC., Seoul (KR)

( * ) Notice: Subject to any disclaimer, the term of this patent is extended or adjusted under 35 U.S.C. 154(b) by 32 days.

(21) Appl. No.: 13/136,725

(22) Filed: Aug. 9, 2011

(65) Prior Publication Data

US 2012/0174221 A1    Jul. 5, 2012

(30) Foreign Application Priority Data

Jan. 4, 2011   (KR) ........................ 10-2011-0000572

(51) Int. Cl.
*G06F 11/00* (2006.01)
*H04L 29/06* (2006.01)
*G06F 12/14* (2006.01)

(52) U.S. Cl.
CPC ......... *H04L 63/1416* (2013.01); *H04L 63/0227* (2013.01); *H04L 63/1458* (2013.01)

(58) Field of Classification Search
CPC .................................................. H04L 63/1416
USPC ........................................... 726/23; 713/166
See application file for complete search history.

(56) References Cited

U.S. PATENT DOCUMENTS

| 2006/0047807 | A1* | 3/2006 | Magnaghi et al. | 709/224 |
| 2007/0106981 | A1* | 5/2007 | Bird | 717/127 |
| 2007/0226802 | A1* | 9/2007 | Gopalan et al. | 726/24 |
| 2008/0195732 | A1* | 8/2008 | Maruyama et al. | 709/224 |
| 2008/0301810 | A1* | 12/2008 | Lehane et al. | 726/23 |

(Continued)

FOREIGN PATENT DOCUMENTS

| KR | 1020040102518 A | 12/2004 |
| KR | 100959264 B1 | 5/2010 |

(Continued)

OTHER PUBLICATIONS

Webpages regarding the publication *Zombie Zero*, Sep. 15, 2010, (Korean language) 4 pages and English language translation (4 pages).

(Continued)

*Primary Examiner* — Ashok Patel
*Assistant Examiner* — Gary Gracia
(74) *Attorney, Agent, or Firm* — Flynn, Thiel, Boutell & Tanis, P.C.

(57) ABSTRACT

Provided are an apparatus and method for blocking a zombie behavior process. The apparatus includes a security policy storage configured to store zombie-behavior-type-specific traffic characteristics and security policies, a traffic monitor configured to monitor traffic generated on the computer and detect abnormal traffic exceeding a predetermined reference value, a process and traffic analyzer configured to find an abnormal process causing the abnormal traffic and detect a zombie behavior type associated with the abnormal process by analyzing the abnormal traffic on the basis of the zombie-behavior-type-specific traffic characteristics stored in the security policy storage, and a process handler configured to handle the process whose zombie behavior type has been detected according to a security policy defined for the detected zombie behavior type. Also, the apparatus according to another aspect includes a system process monitor and handler configured to detect whether or not a file associated with a system process is modified and block the system process.

6 Claims, 4 Drawing Sheets

(56) References Cited

U.S. PATENT DOCUMENTS

| | | | |
|---|---|---|---|
| 2009/0282478 A1* | 11/2009 | Jiang | 726/22 |
| 2009/0288162 A1* | 11/2009 | Shaffer et al. | 726/22 |
| 2010/0050260 A1* | 2/2010 | Nakakoji et al. | 726/23 |
| 2010/0162350 A1* | 6/2010 | Jeong et al. | 726/1 |
| 2010/0162396 A1* | 6/2010 | Liu et al. | 726/23 |
| 2010/0169475 A1* | 7/2010 | Woundy et al. | 709/224 |
| 2010/0235632 A1* | 9/2010 | Iyengar et al. | 713/166 |
| 2010/0235879 A1* | 9/2010 | Burnside et al. | 726/1 |
| 2010/0284283 A1* | 11/2010 | Golic et al. | 370/242 |
| 2011/0055921 A1* | 3/2011 | Narayanaswamy et al. | 726/22 |
| 2011/0055923 A1* | 3/2011 | Thomas | 726/23 |
| 2011/0072516 A1* | 3/2011 | Cohen et al. | 726/22 |
| 2011/0107412 A1* | 5/2011 | Lee et al. | 726/11 |
| 2011/0154492 A1* | 6/2011 | Jeong et al. | 726/23 |
| 2011/0179487 A1* | 7/2011 | Lee | 726/23 |
| 2011/0219440 A1* | 9/2011 | Allen | 726/9 |
| 2012/0174217 A1* | 7/2012 | Ormazabal | 726/22 |
| 2013/0239177 A1* | 9/2013 | Sigurdson et al. | 726/4 |

FOREIGN PATENT DOCUMENTS

| | | |
|---|---|---|
| KR | 1020100074480 A | 7/2010 |
| KR | 1020100074504 A | 7/2010 |
| KR | 1020100098242 A | 9/2010 |
| KR | 1020100119039 A | 11/2010 |

OTHER PUBLICATIONS

Certificate of Program Registration dated Sep. 15, 2010, by Korean Copyright Commission (Korean language), 1 page and (English language translation), 1 page.

Korean Office Action for corresponding Korean Application No. 10-2011-0000572, dated May 2011.

* cited by examiner

APPARATUS AND METHOD FOR BLOCKING ZOMBIE BEHAVIOR PROCESS

CLAIM FOR PRIORITY

This application claims priority to Korean Patent Application No. 10-2011-0000572 filed on Jan. 4, 2011 in the Korean Intellectual Property Office (KIPO), the entire contents of which are hereby incorporated by reference.

BACKGROUND

1. Technical Field

Example embodiments of the present invention relate in general to an apparatus and method for blocking a zombie behavior process, and more specifically, to an apparatus and method for detecting a process infected by a zombie and blocking the process and traffic while operating in a computer system.

2. Related Art

A botnet is a plurality of computers that are connected via a network and infected with a bot which is malicious software. In other words, thousands to hundreds of thousands of computers that are infected with a malicious program, that is, a bot, remotely controlled by a bot master having authority to control bots at will, and capable of performing various types of malicious behavior, are referred to as a botnet.

Since the first appearance of a botnet with EggDrop in 1993, advanced bots such as Forbot, PBot and Txt have emerged during recent ten years. These days, various variants are emerging and making it difficult to cope with the variants themselves. Command and control (C&C) servers and malicious bots for issuing orders to bot zombies and controlling the bot zombies have been extensively spread all over the world. In particular, countries having high-speed Internet service can come under fierce attack such as distributed denial of service (DDoS) and thus are vulnerable to botnet infections.

The worldwide number of zombie computers infected with bots is continuously increasing, and botnets are also increasing in scale. One hundred million to one hundred fifty thousand computers, representing about 11% of all computers in the word, are expected to be infected with bot malicious code and used for an attack. In particular, attack of botnets is a serious problem in that the attacks tend to be criminal, such as threats to cause problems to a company's service.

Early botnets were mainly Internet relay chat (IRC) botnets using characteristics of IRC that had a flexible structure and was widely used, but have evolved into botnets based on hypertext transfer protocol (HTTP), which is a web protocol, making it difficult to detect and cope with the botnets, or peer-to-peer (P2P) botnets in which all zombies can be C&C servers. According to an application target, technology for coping with such botnets is classified into host-based technology for detecting and analyzing a botnet on a computer on the basis of bot behavior, and network-based technology for detecting and analyzing a botnet on the basis of network traffic from a bot zombie computer and a C&C server.

With the disclosure of the severity of botnets, active research has recently been underway to block a botnet. However, the research has mainly been carried out for IRC botnets, and only the present situation, characteristics, etc. have been researched for HTTP and P2P botnets. Most conventional research on IRC botnets has problems in that it is possible to evade detection by channel encryption, stealth scanning, command/control pattern change, domain name server (DNS) spoofing, etc., a misdetection may occur, and a countermeasure against recent HTTP/P2P botnets is insufficient.

SUMMARY

Accordingly, example embodiments of the present invention are provided to substantially obviate one or more problems due to limitations and disadvantages of the related art.

Example embodiments of the present invention provide an apparatus for blocking zombie behavior capable of reducing misdetection and coping with new botnets by precisely analyzing behaviors of a botnet.

Example embodiments of the present invention also provide a method of blocking zombie behavior capable of reducing misdetection and coping with new botnets by precisely analyzing behaviors of a botnet.

In some example embodiments, an apparatus for blocking zombie behavior performed in a computer connected to a network, the zombie behavior process being generated in the computer, and attacking external computers, includes: a security policy storage configured to store zombie-behavior-type-specific traffic characteristics and security policies; a traffic monitor configured to monitor traffic generated on the computer and detect abnormal traffic exceeding a predetermined reference value; a process and traffic analyzer configured to find an abnormal process causing the abnormal traffic, and detect a zombie behavior type associated with the abnormal process by analyzing the abnormal traffic on the basis of the zombie-behavior-type-specific traffic characteristics stored in the security policy storage; and a process handler configured to handle the process whose zombie behavior type has been detected according to a security policy defined for the detected zombie behavior type.

Here, the apparatus for blocking zombie behavior may be disposed in a network driver stage of the computer.

The zombie behavior type may include at least one of a distributed denial of service (DDoS) attack, Internet protocol (IP) scanning, port scanning, and a spoofing attack.

The zombie behavior type may include other types, and when the zombie behavior type of the abnormal process has not been detected, a security policy defined for the other types may be applied to the abnormal process.

The zombie-behavior-type-specific traffic characteristics stored in the security policy storage may include zombie-behavior-type-specific traffic threshold values and allowed traffic threshold value exceeding times.

The process and traffic analyzer may detect the zombie behavior type associated with the abnormal process by searching for a zombie behavior type corresponding to a characteristic of the abnormal traffic caused by the abnormal process on the basis of the zombie-behavior-type-specific traffic threshold values stored in the security policy storage, and determining that the abnormal process is associated with the searched zombie behavior type when the abnormal traffic caused by the abnormal process continues for more than an allowed traffic threshold value exceeding time corresponding to the searched zombie behavior type.

The predetermined reference value may be defined in the security policy storage.

The apparatus may further include a new zombie behavior type storage, and when the zombie behavior type associated with the abnormal process has not been detected, the process and traffic analyzer may store a characteristic of the abnormal traffic caused by the abnormal process in the new zombie behavior type storage.

The apparatus may further include an event log storage configured to store an event occurring in association with the abnormal process.

The zombie-behavior-type-specific traffic characteristics and security policies may be distributed and updated through an enterprise security management (ESM) server.

In other example embodiments, a method of blocking zombie behavior performed in a network driver stage of a computer connected to a network includes: monitoring traffic generated on the computer to detect abnormal traffic exceeding a predetermined reference value; finding an abnormal process causing the abnormal traffic, and finding a zombie behavior type associated with the abnormal process by analyzing the abnormal traffic on the basis of zombie-behavior-type-specific traffic characteristics stored in a security policy storage; handling the abnormal process according to a security policy for the zombie behavior type defined in the security policy storage when the zombie behavior type of the abnormal process has been found; handling the abnormal process according to a security policy for other types defined in the security policy storage when the zombie behavior type having a characteristic of the abnormal traffic caused by the abnormal process has not been found; and storing the characteristic of the traffic caused by the process whose zombie behavior type has not been found in a new zombie behavior type storage.

The zombie-behavior-type-specific traffic characteristics stored in the security policy storage may include zombie-behavior-type-specific traffic threshold values and allowed traffic threshold value exceeding times, and finding the zombie behavior type associated with the abnormal process may include searching for a zombie behavior type corresponding to the characteristic of the abnormal traffic caused by the abnormal process on the basis of the zombie-behavior-type-specific traffic threshold values stored in the security policy storage, and determining that the process is associated with the searched zombie behavior type when the abnormal traffic caused by the abnormal process continues for more than an allowed traffic threshold value exceeding time corresponding to the searched zombie behavior type.

The method may further include storing an event log generated in association with the abnormal process, and the zombie-behavior-type-specific traffic characteristics and security policies may be distributed and updated through an ESM server, and the event log and the characteristic of the traffic caused by the abnormal process stored in the new zombie behavior type storage may be transmitted to the ESM server.

In other example embodiments, an apparatus for blocking zombie behavior includes: a system process reference list storage configured to store reference information about system processes used by an operating system of the computer; a system process monitor configured to analyze a system process under execution in the computer, and a sub-process and files associated with the process on the basis of the reference information about the system processes, and determine the system process as a modified process when the system process, the sub-process, and the files are different from the reference information; and a modified-process handler configured to handle the modified process, the associated sub-process, and the associated files according to a security policy when the system process monitor detects the modified process.

Here, extensions of the files associated with the system process may be at least one of DLL, SYS and EXE, and the modification may include change of the files associated with the system process and addition of a file.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
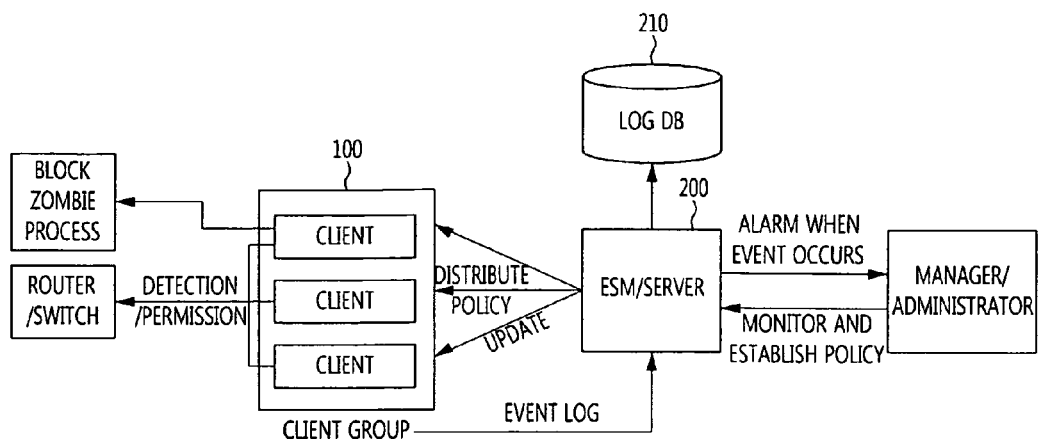
FIG. 1 is a conceptual diagram schematically showing an overall constitution of an apparatus for blocking zombie behavior according to an example embodiment of the present invention.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described with reference to appended drawings.

Example embodiments of the present invention provide an apparatus and method for blocking a zombie behavior process on a computer. In particular, the method of blocking a zombie behavior process according to an example embodiment of the present invention classifies zombie-behavior-type-specific traffic characteristics, and applies a blocking policy for a process causing similar traffic to that of the corresponding zombie behavior type. Unlike a method of blocking zombie behavior by pattern analysis, such a method of blocking a process according to zombie behavior type can block a new zombie behavior process having an unknown pattern, and thus can also block new or variant zombie behavior without updating a pattern.

Also, the apparatus for monitoring and blocking a zombie behavior process according to an example embodiment of the present invention can be disposed in a network driver stage of a host computer, and thus can detect a zombie computer causing excessive traffic by collecting a packet at a network gateway stage or switch, or promptly and precisely detect a zombie behavior process and block associated traffic in comparison with a method of blocking a process by analyzing a message for communication with a server.

The overall constitution of an apparatus for blocking zombie behavior according to an example embodiment of the present invention and a method of blocking zombie behavior will be described below, and blocking policies for blocking zombie behavior will be described in further detail. Also, a method of blocking zombie behavior by monitoring a system process will be described.

Constitution of Apparatus for Blocking Zombie Behavior

FIG. 1 is a conceptual diagram schematically showing an overall constitution of an apparatus for blocking zombie behavior according to an example embodiment of the present invention.

Referring to FIG. 1, an apparatus for blocking zombie behavior according to an example embodiment of the present invention includes a zombie behavior blocking engine 100 that operates in a host computer of a client, an enterprise security management (ESM) server 200, and an event log database 210.

The overall constitution of the apparatus for blocking zombie behavior according to an example embodiment of the present invention will be described in detail below with reference to FIG. 1.

The zombie behavior blocking engine 100 according to an example embodiment of the present invention operates in a host computer of a client. The zombie behavior blocking engine 100 serves to monitor and block abnormal traffic processed on the computer and a process associated with the abnormal traffic on the basis of a security policy distributed through the ESM server 200. Also, the zombie behavior blocking engine 100 transmits an event log generated by monitoring traffic and a process to the ESM server 200.

The ESM server 200 according to an example embodiment of the present invention defines zombie-behavior-type-specific traffic characteristics, determines zombie-behavior-type-specific security policies, and distributes the determined security policies to respective client computers. Also, when the zombie blocking engine 100 operating in a client stage is modified, the ESM server 200 serves to distribute the update version to clients. Meanwhile, the ESM server 200 analyzes a security log associated with zombie behavior and transmitted from the client stage and reflects the analysis results in a security policy.

Further, the ESM server 200 classifies clients into groups and synthetically manages group-specific event policies. When an emergency event occurs in a client, the ESM server 200 enables rapid management of the emergency situation using an alarm function without continuous monitoring. According to setting of a security policy, the emergency situation may be flexibly handled.

A detailed constitution of an apparatus for blocking zombie behavior according to an example embodiment of the present invention will be described below.

Figure 2:
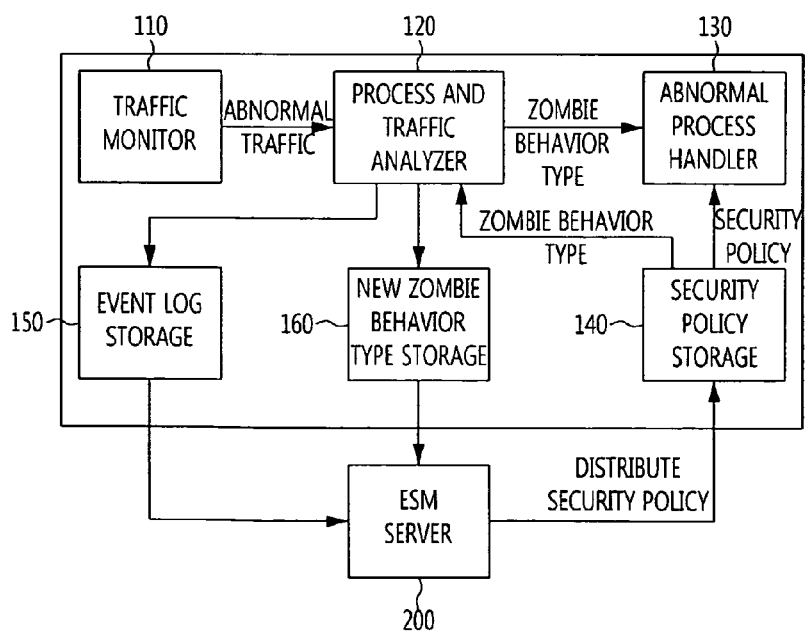
FIG. 2 is a block diagram showing a constitution of an apparatus for blocking zombie behavior according to an example embodiment of the present invention and connection between components of the apparatus.

FIG. 2 is a block diagram showing a constitution of an apparatus for blocking zombie behavior according to an example embodiment of the present invention and connection between components of the apparatus.

Referring to FIG. 2, an apparatus for blocking zombie behavior according to an example embodiment of the present invention includes a traffic monitor 110, a process and traffic analyzer 120, an abnormal process handler 130, a security policy storage 140, an event log storage 150, and a new zombie behavior type storage 160.

Also, the apparatus for blocking zombie behavior according to an example embodiment of the present invention is configured to interoperate with the ESM server 200 that is an enterprise-wide security management server.

The components of the apparatus for blocking zombie behavior according to an example embodiment of the present invention and connection between the components will be described in detail below with reference to FIG. 2.

The traffic monitor 110 monitors traffic processed on a computer to detect a process associated with traffic exceeding a predetermined reference value. In particular, when traffic exceeding the reference value occurs, the traffic monitor 110 transfers the traffic to the process and traffic analyzer 120.

The process and traffic analyzer 120 finds an abnormal process that causes the abnormal traffic transferred by the traffic monitor 110, and analyzes a traffic characteristic. The process and traffic analyzer 120 analyzes and compares the characteristic of the traffic caused by the abnormal process with zombie-behavior-specific traffic characteristics stored in the security policy storage 140, thereby finding and transferring a zombie behavior type having the same abnormal traffic characteristic as the abnormal process to the abnormal process handler 130. Also, the process and traffic analyzer 120 collects and stores an event log generated in association with the abnormal process in the event log storage 150.

Meanwhile, when a zombie behavior type having the same abnormal traffic characteristic as the abnormal process has not been found in the security policy storage 140, the process and traffic analyzer 120 stores the traffic characteristic of the process in the new zombie behavior type storage 160 and transfers the abnormal process to the abnormal process handler 130.

The event log stored in the event log storage 150 and the new zombie behavior type stored in the new zombie behavior type storage 160 are transferred to the ESM server 200 later, analyzed, and reflected in a security policy.

The abnormal process handler 130 handles the abnormal process received from the process and traffic analyzer 120 according to the corresponding security policy with reference to the zombie-behavior-type-specific security policies of the security policy storage 140. When the received abnormal process is a new zombie behavior, the abnormal process handler 130 handles the abnormal process with reference to a security policy for other types of zombie behavior.

The security policy storage 140 stores a security policy associated with a zombie behavior process, and defines zombie behavior types and zombie-behavior-type-specific traffic characteristics and security policies. A traffic characteristic of a zombie behavior type, for example, a distributed denial of service (DDoS) attack, is defined, and a blocking policy for a process in which the zombie behavior has been detected is defined. Also, to prepare for a zombie behavior type that has not been present when a security policy is established, a method of handling a process having a new zombie behavior type, that is, other types of zombie behavior, may be defined.

Such a security policy may be distributed to clients through the ESM server 200 all at once, or defined or adjusted in each client computer according to environment. Also, the ESM server 200 collects and analyzes an event log and a new zombie behavior type occurring in a client, and may add or modify a security policy.

Security policies stored in the security policy storage 140 will be described in further detail later.

The event log storage 150 stores the event log associated with the zombie behavior process, and is intended to issue a report on analysis of a process causing much traffic or reflect the analysis results in a security policy.

When a new abnormal process causing traffic exceeding the reference value occurs, and thus the corresponding zombie behavior type has not been defined in the security policy storage 140, the new zombie behavior type storage 160 defines a traffic characteristic of the new zombie behavior type to reflect the new zombie behavior type in a security policy later. The stored traffic characteristic of the new zombie behavior type may be transmitted to the ESM server 200, analyzed and reflected in a security policy.

The ESM server 200 interoperates with the apparatus for blocking zombie behavior according to an example embodiment of the present invention to define and distribute a security policy associated with a zombie behavior process to respective clients. Also, the ESM server 200 analyzes an event log and a traffic type of new zombie behavior transmitted from each client, and reflects the analysis result in a security policy.

Constitution of Security Policy for Blocking Zombie Behavior

A constitution of a security policy stored in the security policy storage 140 of the apparatus for blocking zombie behavior according to an example embodiment of the present invention will be described in detail below.

Figure 3:
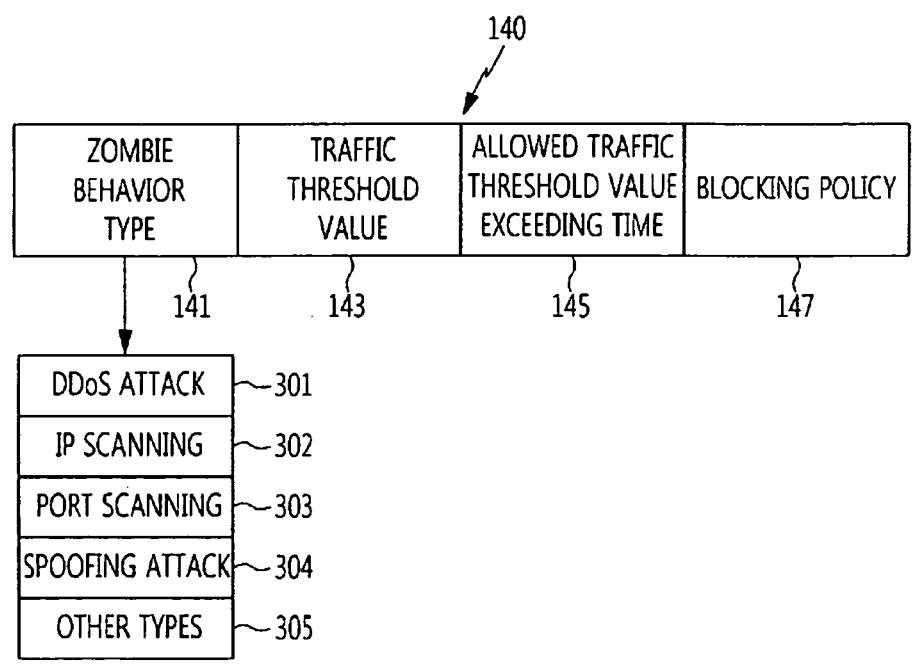
FIG. 3 is a conceptual diagram showing an example of a detailed constitution of a security policy for blocking zombie behavior according to an example embodiment of the present invention.

FIG. 3 is a conceptual diagram showing an example of a detailed constitution of a security policy for blocking zombie behavior according to an example embodiment of the present invention.

Referring to FIG. 3, a security policy for blocking zombie behavior according to an example embodiment of the present invention includes a zombie behavior type 141, a zombie-behavior-type-specific traffic threshold value 143, an allowed traffic threshold value exceeding time 145, and a blocking policy 147.

A security policy for blocking zombie behavior and a method of detecting a zombie behavior type according to example embodiments of the present invention will be described in further detail below with reference to FIG. 3.

In an example embodiment of the present invention, the zombie behavior type 141 is classified, and traffic is analyzed and defined according to the zombie behavior type.

The zombie behavior type 141 includes a DDoS attack 301, Internet protocol (IP) scanning 302, port scanning 303, and a spoofing attack 304, and a traffic characteristic of the corresponding zombie behavior type may be defined. To prepare for zombie behavior of a type that has not been defined in advance, a blocking policy for other types 305 of zombie behavior may also be defined.

As zombie-behavior-specific traffic characteristics, the traffic threshold value 143 and the allowed traffic threshold value exceeding time 145 may be included. In other words, when traffic associated with a process has the same traffic characteristic as a specific zombie behavior type and continues for more than the allowed traffic threshold value exceeding time 145, the blocking policy 147 for the process and traffic may be applied.

For example, when abnormal traffic is detected by a traffic monitor, the zombie behavior type 141 corresponding to a characteristic of traffic caused by an abnormal process is searched for on the basis of zombie-behavior-type-specific threshold values stored in the security policy storage 140 to find a zombie behavior type associated with the abnormal process causing the abnormal traffic. Also, when the traffic of the abnormal process continues for more than the allowed traffic threshold value exceeding time 145 corresponding to the searched zombie behavior type 141, the abnormal process may be determined to perform the searched type 141 of zombie behavior, and the blocking policy 147 may be applied.

Description of Zombie Behavior Blocking Process

A process of blocking zombie behavior according to an example embodiment of the present invention will be described in detail below according to respective steps.

Figure 4:
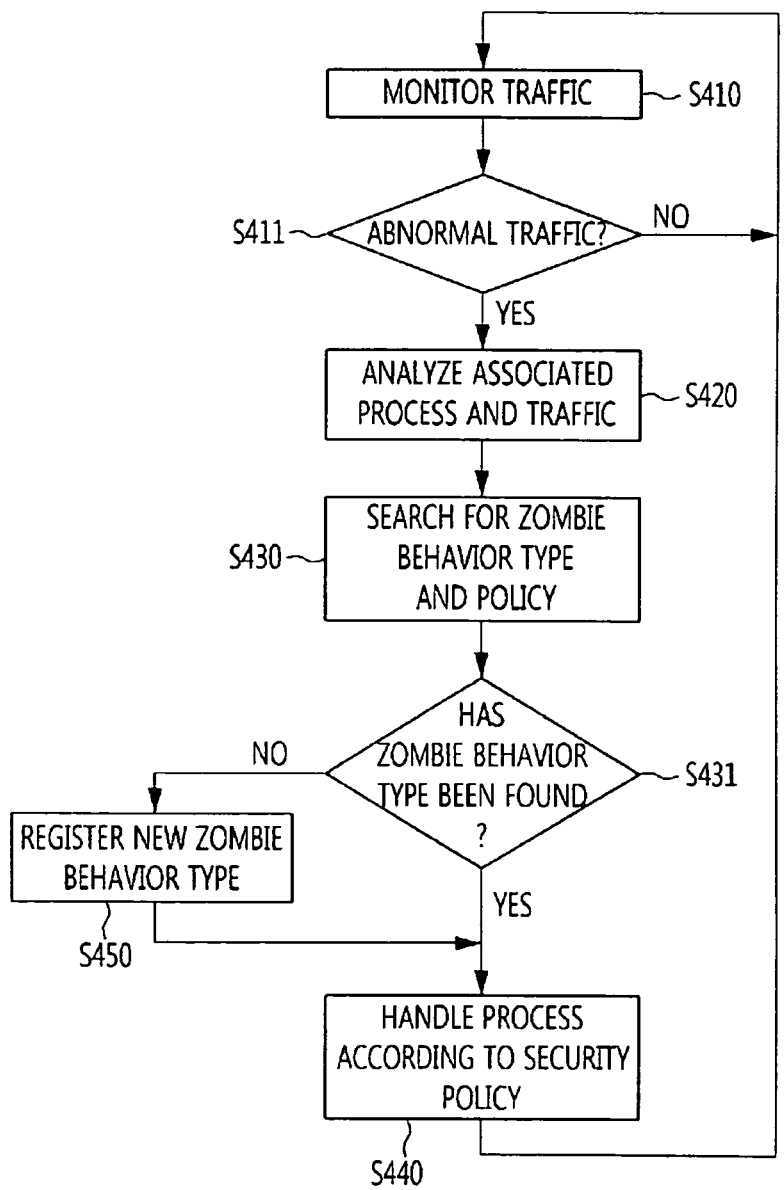
FIG. 4 is a flowchart illustrating a process of blocking zombie behavior by monitoring traffic and a process according to an example embodiment of the present invention.

FIG. 4 is a flowchart illustrating a process of blocking zombie behavior by monitoring traffic and a process according to an example embodiment of the present invention.

Referring to FIG. 4, a process of blocking zombie behavior includes a traffic monitoring step (S410), an associated process and traffic analysis step (S420), a zombie behavior type and policy search step (S430), a process handling step (S440), and a new zombie behavior type registration step (S450).

The respective steps for blocking zombie behavior will be described in detail below with reference to FIG. 4.

The traffic monitoring step (S410) involves detecting traffic exceeding a predetermined reference value in a network driver stage of a computer while monitoring all traffic generated on the computer.

When abnormal traffic is detected in step 411, a process causing the traffic is promptly found, and the traffic is analyzed in detail (S420).

A zombie behavior type having the same traffic characteristic as the abnormal traffic caused by the abnormal process is found with reference to a security policy (S430). Also, when the traffic continues for more than an allowed time, the process is determined as a process associated with the found zombie behavior type (S431).

A blocking policy predetermined for zombie behavior of the corresponding type is applied to the process whose zombie behavior type has been found (S440). However, when a zombie behavior type corresponding to a characteristic of the traffic caused by the abnormal process has not been found, a blocking policy for other types defined in a security policy storage is applied. Also, a traffic characteristic of the newly found zombie behavior type is registered as a new zombie behavior type (S450).

In this way, a predetermined blocking policy is uniformly applied to new types of zombie behavior, and a blocking policy is established on the basis of traffic data of collected new zombie behavior types and may be used to update a security policy later.

Constitution of Apparatus for Blocking Zombie Behavior through System Process Monitoring An apparatus for blocking zombie behavior by monitoring a system process according to an example embodiment of the present invention will be described.

Figure 5:
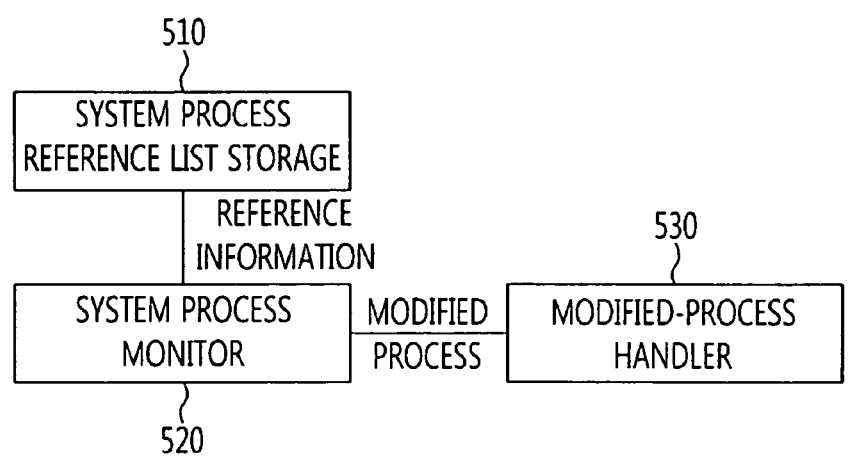
FIG. 5 is a block diagram of an apparatus for blocking zombie behavior by monitoring a system process according to an example embodiment of the present invention.

FIG. 5 is a block diagram of an apparatus for blocking zombie behavior by monitoring a system process according to an example embodiment of the present invention.

Referring to FIG. 5, an apparatus for blocking zombie behavior through system process monitoring according to an example embodiment of the present invention includes a system process reference list storage 510, a system process monitor 520, and a modified-process handler 530.

The apparatus for blocking zombie behavior through system process monitoring will be described in detail below with reference to FIG. 5.

The system process reference list storage 510 stores reference information about system processes used by an operating system of a computer. A sub-file, all file names, and information about files associated with a system process, for example, SVCHOST.EXE may be stored. In general, file names having extensions of DLL, SYS and EXE may be included, and attribute information including sizes, creation dates, used dates, etc. of the files may be included.

The system process monitor 520 analyzes a system process under execution in the computer and a sub-process and files associated with the process on the basis of the reference information about the system processes, and determines the system process as a modified process when the system process, the sub-process, and the files are different from the reference information.

For example, when reference information associated with a process under execution is searched for in the reference list storage 510, a file that is not associated with the process under execution may be added, or attribute information about an associated file may be modified. In this case, the system process monitor 520 determines that the process under execution has been modified.

When the system process monitor 520 detects a modified process, the modified-process handler 530 handles the modified process, an associated sub-process, and an associated file according to a security policy.

Using the above-described apparatus and method for blocking zombie behavior according to example embodiments of the present invention, abnormal traffic is detected, and an associated process is found and analyzed. Accordingly, it is possible to block a process performing zombie behavior, and cope with a newly generated zombie by analyzing zombie-behavior-specific traffic characteristics.

While the example embodiments of the present invention and their advantages have been described in detail, it should be understood that various changes, substitutions and alterations may be made herein without departing from the scope of the invention.

What is claimed is:

1. An apparatus for blocking a zombie behavior process performed in a computer connected to a network, the zombie behavior process being generated in the computer, and attacking external computers, comprising:

an enterprise security management (ESM) server;

a security policy storage receiving security policies including one or more zombie behavior type, traffic threshold values related to a specific zombie behavior type, an allowed times exceeding traffic threshold value related to the specific zombie behavior type, and blocking policies related to the specific zombie behavior type from the ESM server, the security policy storage storing the security policies;

a traffic monitor monitoring traffic generated on the computer and detecting abnormal traffic exceeding a predetermined reference value in a network driver stage of the computer while monitoring all traffic generated on the computer;

a process and traffic analyzer detecting an abnormal process causing the abnormal traffic, and detecting a zombie behavior type associated with the abnormal process by analyzing the abnormal traffic related to the abnormal process on the basis of the traffic threshold values and the allowed times exceeding traffic threshold value;

a process handler handling the abnormal process, whose zombie behavior type has been detected on the basis of a blocking policy defined for the detected zombie behavior type;

an event log storage storing an event log generated in association with the abnormal process and transmitting the event log to the EMS server; and a new zombie type storage storing traffic characteristics of a new abnormal process whose zombie behavior type has not been detected and transmitting the traffic characteristics of the new abnormal process to the EMS server;

wherein the analyzed abnormal traffic exceeds both the traffic threshold values and the allowed times exceeding traffic threshold value; and wherein the security policies are updated based on the event log and the traffic characteristics of the new abnormal process by the EMS server;

wherein the apparatus is disposed in a network driver stage of the computer connected to the network;

wherein the zombie behavior type includes other types of behaviors; and when the zombie behavior type of the new abnormal process has not been detected, a security policy defined for the other types of behaviors is applied to the abnormal process.

2. The apparatus of claim 1, wherein the zombie behavior type includes at least one of a distributed denial of service (DDoS) attack, Internet protocol (IP) scanning, port scanning, and a spoofing attack.

3. The apparatus of claim 1, wherein the process and traffic analyzer detects the zombie behavior type associated with the abnormal process by searching for a corresponding zombie behavior type corresponding to a characteristic of the abnormal traffic caused by the abnormal process on the basis of the traffic threshold values stored in the security policy storage, and determining that the abnormal process is associated with the corresponding zombie behavior type when the abnormal traffic caused by the abnormal process continues for more than the allowed time exceeding traffic threshold value corresponding to the corresponding zombie behavior type.

4. The apparatus of claim 1, wherein the predetermined reference value is defined in the security policy storage.

5. A method of blocking a zombie behavior process generated in a computer connected to a network and attacking an external computer, the method being performed in a network driver stage of the computer and comprising:
   receiving security policies including one or more zombie behavior type, traffic threshold values related to specific zombie behavior type, an allowed times exceeding traffic threshold value related to specific zombie behavior type, and blocking policies related to specific zombie behavior type from an enterprise security management (ESM) server;
   storing the security policies to a security policy storage;
   monitoring traffic generated on the computer to detect abnormal traffic exceeding a predetermined reference value in a network driver stage of the computer while monitoring all traffic generated on the computer connected to the network:
   detecting an abnormal process causing the abnormal traffic, and detecting a zombie behavior type associated with the abnormal process by analyzing the abnormal traffic related to the abnormal process on the basis of the traffic threshold values and the allowed times exceeding traffic threshold value stored in the security policy storage;
   when the zombie behavior type of the abnormal process has been found, handling the abnormal process on the basis of the blocking policies for the zombie behavior type defined in the security policy storage, and transmitting an event log generated in association with the abnormal process to the EMS server; and
   when the zombie behavior type having a characteristic of the abnormal traffic caused by a new abnormal process has not been detected, handling the new abnormal process on the basis of the security policies for other types defined in the security policy storage, and transmitting the traffic characteristics of the new abnormal process to the EMS server;
   wherein the analyzed abnormal traffic exceeds both the traffic threshold values and the allowed times exceeding traffic threshold value;
   wherein the security policies are updated based on the event log and the traffic characteristics of the new abnormal process by the EMS server;
wherein the zombie behavior type includes other types of behaviors; and
   when the zombie behavior type of the new abnormal process has not been detected, a security policy defined for the other types of behaviors is applied to the abnormal process.

6. The method of claim 5, wherein detecting the zombie behavior type associated with the abnormal process includes:
   searching for a corresponding zombie behavior type corresponding to a characteristic of the abnormal traffic caused by the abnormal process on the basis of the traffic threshold values stored in the security policy storage, and determining that the process is associated with the corresponding zombie behavior type when the abnormal traffic caused by the abnormal process continues for more than the allowed time exceeding traffic threshold value corresponding to the corresponding zombie behavior type.

\* \* \* \* \*